(12) United States Patent
Park et al.

(10) Patent No.: US 9,694,312 B2
(45) Date of Patent: Jul. 4, 2017

(54) CARBON DIOXIDE CAPTURE APPARATUS

(71) Applicant: KOREA RESEARCH INSTITUTE OF CHEMICAL TECHNOLOGY, Daejeon (KR)

(72) Inventors: Yong Ki Park, Daejeon (KR); Won Choon Choi, Daejeon (KR); Na Young Kang, Yesan (KR); Hwi Min Seo, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 14/773,968

(22) PCT Filed: Mar. 12, 2014

(86) PCT No.: PCT/KR2014/002078
§ 371 (c)(1),
(2) Date: Sep. 9, 2015

(87) PCT Pub. No.: WO2014/142556
PCT Pub. Date: Sep. 18, 2014

(65) Prior Publication Data
US 2016/0016108 A1    Jan. 21, 2016

(30) Foreign Application Priority Data
Mar. 13, 2013    (KR) .................. 10-2013-0026593

(51) Int. Cl.
*B01D 53/08*    (2006.01)
*B01D 53/04*    (2006.01)
(Continued)

(52) U.S. Cl.
CPC ......... *B01D 53/0462* (2013.01); *B01D 53/08* (2013.01); *B01D 53/12* (2013.01);
(Continued)

(58) Field of Classification Search
CPC .... B01D 53/12; B01D 53/62; B01D 53/0462; B01D 2251/30; B01D 2251/40;
(Continued)

(56) References Cited

U.S. PATENT DOCUMENTS

| | | | |
|---|---|---|---|
| 2,904,507 A * | 9/1959 | Jahnig .................. | B01D 15/02 208/310 R |
| 2009/0120288 A1* | 5/2009 | Lackner ............ | B01D 53/0462 95/68 |

(Continued)

FOREIGN PATENT DOCUMENTS

| | | |
|---|---|---|
| CN | 101592449 B | 1/2012 |
| JP | 2008-307520 A | 12/2008 |

(Continued)

OTHER PUBLICATIONS

Choi et al., "Adsorbent Materials for Carbon Dioxide Capture from Large Anthropogenic Point Sources". ChemSus Chem 2009, 2, 796-854, pp. 796-854.

(Continued)

*Primary Examiner* — Frank Lawrence
(74) *Attorney, Agent, or Firm* — STIP Law Group, LLC

(57) ABSTRACT

The present invention relates to a carbon dioxide capture apparatus having a temperature swing adsorption mode for selective separation of carbon dioxide from flue gases. The carbon dioxide capture apparatus comprises: a carbon dioxide sorption column including a carbon dioxide adsorption unit in which adsorption of carbon dioxide from flue gases occurs; a carbon dioxide desorption column connected to the carbon dioxide sorption column and including a carbon dioxide desorption unit in which desorption of the adsorbed carbon dioxide occurs; a carbon dioxide absorbent repeatedly adsorbing and desorbing carbon dioxide while circulating through the carbon dioxide sorption column and the carbon dioxide desorption column; and a heat exchange unit (Continued)

in which heat exchange occurs between the absorbent after carbon dioxide adsorption and the absorbent after carbon dioxide desorption.

10 Claims, 10 Drawing Sheets

(51) Int. Cl.
*B01D 53/62* (2006.01)
*B01D 53/12* (2006.01)

(52) U.S. Cl.
CPC .......... *B01D 53/62* (2013.01); *B01D 2251/30* (2013.01); *B01D 2251/40* (2013.01); *B01D 2253/102* (2013.01); *B01D 2253/106* (2013.01); *B01D 2253/108* (2013.01); *B01D 2253/204* (2013.01); *B01D 2257/504* (2013.01); *B01D 2258/025* (2013.01); *B01D 2258/0283* (2013.01); *B01D 2259/40098* (2013.01); *Y02C 10/04* (2013.01); *Y02C 10/06* (2013.01); *Y02C 10/08* (2013.01)

(58) Field of Classification Search
CPC ........ B01D 2253/102; B01D 2253/106; B01D 2253/108; B01D 2253/204; B01D 2257/504; B01D 2258/025; B01D 2258/0283; B01D 2259/40098; Y02C 10/04; Y02C 10/06; Y02C 10/08
USPC ...... 95/107–110, 114, 115, 139; 96/126, 150
See application file for complete search history.

(56) References Cited

U.S. PATENT DOCUMENTS

| | | | |
|---|---|---|---|
| 2011/0005395 A1* | 1/2011 | Vimalchand | B01D 53/08 96/146 |
| 2014/0251136 A1* | 9/2014 | Park | B01D 53/62 95/108 |

FOREIGN PATENT DOCUMENTS

| | | |
|---|---|---|
| JP | 2012-115826 A | 6/2012 |
| KR | 10-2005-0003767 A | 1/2005 |
| KR | 10-2010-0092466 A | 8/2010 |
| KR | 10-2010-0099929 A | 9/2010 |
| KR | 10-2011-0054948 A | 5/2011 |

OTHER PUBLICATIONS

Wang et al., "$CO_2$ capture by solid adsorbents and their applications: current status and new trends". Energy Environ. Sci., 2011, 4, pp. 42-55.

International Search Report for PCT/KR2014/002078 dated Jul. 7, 2014.

* cited by examiner

Absorbent from sorption column

Absorbent from desorption column

CARBON DIOXIDE CAPTURE APPARATUS

RELATED APPLICATIONS

This application is the U.S. National Phase under 35 U.S.C. §371 of International Application No. PCT/KR2014/002078, filed on Mar. 12, 2014, which in turn claims the benefit of Korean Application No. 10-2013-0026593, filed on Mar. 13, 2013, the disclosures of which are incorporated by reference into the present application.

TECHNICAL FIELD

The present invention relates to a carbon dioxide capture apparatus, and more specifically to a carbon dioxide capture apparatus that prevents carbon dioxide present in flue gases from industrial facilities responsible for large emissions of carbon dioxide, such as power plants and steel mills, from being exhausted into the atmosphere.

BACKGROUND ART

Due to recent global warming, the polar icecaps have been melting, causing a rise in the sea level. Recent changes in climate have caused unusual weather phenomena around the world. Global warming is known to be attributed to increased greenhouse gas emissions. International agreements have been signed to restrict the emission of carbon dioxide. Attempts to suppress the emission of carbon dioxide by the introduction of carbon credits become economic issues in individual countries around the world. Efforts to reduce the emission of carbon dioxide have been directed towards the development of alternative energy sources (such as solar energy and wind energy) capable of replacing fossil fuels, and techniques for the capture and storage of carbon dioxide from fossil fuels while preventing the carbon dioxide from being released into the atmosphere. The latter techniques are called carbon capture and storage (CCS) techniques and are broadly divided into techniques for capturing carbon dioxide from power plants and steel mills and techniques for storing captured carbon dioxide in the soil or ocean.

The carbon dioxide capture techniques can be divided into post-combustion capture, pre-combustion capture, and oxy-fuel capture according to stages at which carbon dioxide is captured. The carbon dioxide capture techniques can also be divided into membrane separation, liquid phase separation, and solid phase separation techniques according to the principles of carbon dioxide capture. The membrane separation techniques use separation membranes to concentrate carbon dioxide, the liquid phase separation techniques use liquid absorbents such as amines or aqueous ammonia, and the solid phase separation techniques use solid phase absorbents such as alkali or alkaline earth metals.

The present invention is directed to a capture technique for continuously concentrating carbon dioxide contained in large amounts of flue gases from power plants and combustion furnaces by using an absorbent. The capture technique of the present invention belongs to post-combustion solid phase separation techniques for processing carbon dioxide contained in flue gases released after combustion.

The solid phase separation techniques are largely directed towards the development of solid phase absorbents having any absorbability for carbon dioxide and the capture process of carbon dioxide using solid phase absorbents. Carbon dioxide capture efficiency is greatly affected by the efficiency of absorption processes as well as the performance of solid phase absorbents.

Solid phase absorbents can be broadly classified into organic, inorganic, carbon-based, and organic-inorganic hybrid absorbents by the kind of their constituent materials. Solid phase absorbents can also be classified into physical absorbents and chemical absorbents based on their mechanism of carbon dioxide absorption. Representative examples of such solid phase absorbents include: amine polymer absorbents as organic absorbents; zeolite-based absorbents, alkali absorbents, and alkaline earth metal absorbents as inorganic absorbents; activated carbon absorbents modified with alkali metals as carbon-based absorbents; and MOF absorbents and porous silica absorbents grafted with organic materials having an amine group as organic-inorganic hybrid absorbents. Carbon dioxide is physically adsorbed to zeolite-based and carbon-based absorbents. Carbon dioxide is absorbed to the other absorbents through chemical reactions (Energy Environ. Sci. 2011, 4, 42. Chem Sus Chem 2009, 2, 796).

Such carbon dioxide capture processes using dry absorbents can be classified into pressure swing adsorption (PSA) processes and temperature swing adsorption (TSA) processes by the factors they use. The PSA processes use a pressure difference and the TSA processes use a temperature difference to desorb absorbed carbon dioxide. Generally, pressure swing adsorption processes using fixed bed sorption columns are advantageous in the capture of carbon dioxide on a small scale, and easy-to-scale-up temperature swing adsorption processes using fluidized bed sorption and desorption columns are advantageous in the capture of a large amount of carbon dioxide from power plants or large combustion furnaces.

The present invention is intended to capture a large amount of carbon dioxide in a continuous manner using a solid absorbent and is based on a temperature swing adsorption process using fluidized bed sorption columns and desorption columns.

Sorption columns and desorption columns used in temperature swing adsorption processes can be divided into bubbling fluidized bed columns and dilute fluidized bed columns according to the concentration of absorbents in operating stages. Absorbents are present at high concentrations in the bubbling fluidized bed columns and at low concentrations in the dilute fluidized bed columns. The application of such bubbling fluidized beds and dilute fluidized beds to sorption columns and desorption columns provides four possible combinations such as: i) dilute fluidized bed columns-dilute fluidized bed columns, ii) dilute fluidized bed columns-bubbling fluidized bed columns, iii) bubbling fluidized bed columns-dilute fluidized bed columns, and iv) bubbling fluidized bed columns-bubbling fluidized bed columns ("Fluidization Engineering", D. Kunii and O. Levenspiel, Robert E. Krieger, 1977).

Korean Patent Publication Nos. 2005-0003767, 2010-0099929, and 2011-0054948 disclose fluidized bed processes for carbon dioxide capture that use dry solid absorbents based on the concept of temperature swing adsorption using dilute fluidized bed sorption columns and bubbling fluidized bed desorption columns. According to such solid phase separation processes based on the concept of temperature swing adsorption, however, a vast amount of energy of at least 2 GJ/t-$CO_2$ is consumed to desorb carbon dioxide from absorbents. This energy consumption is a cause of increased capture cost, together with the cost of the absorbents. Thus, it is very important to develop a technology by which carbon dioxide can be effectively desorbed from absorbents with less energy, achieving reduced capture cost.

DETAILED DESCRIPTION OF THE INVENTION

Problems to be Solved by the Invention

A first object of the present invention is to provide a carbon dioxide capture apparatus constructed such that heat is exchanged between an absorbent escaping from a carbon dioxide adsorption unit after carbon dioxide adsorption and the absorbent escaping from a carbon dioxide desorption unit after carbon dioxide desorption, contributing to the reduction of energy consumption needed to capture carbon dioxide.

A second object of the present invention is to provide a carbon dioxide capture method by which heat is exchanged between an absorbent escaping from a carbon dioxide adsorption unit after carbon dioxide adsorption and the absorbent escaping from a carbon dioxide desorption unit after carbon dioxide desorption, contributing to the reduction of energy consumption needed to capture carbon dioxide.

Means for Solving the Problems

In order to achieve the first object of the present invention, there is provided a carbon dioxide capture apparatus having a temperature swing adsorption mode for selective separation of carbon dioxide from flue gases which contains carbon dioxide, comprising: a carbon dioxide sorption column including a carbon dioxide adsorption unit in which adsorption of carbon dioxide from flue gases occurs; a carbon dioxide desorption column connected to the carbon dioxide sorption column and including a carbon dioxide desorption unit in which desorption of the adsorbed carbon dioxide occurs; a carbon dioxide absorbent repeatedly adsorbing and desorbing carbon dioxide while circulating through the carbon dioxide sorption column and the carbon dioxide desorption column; and a heat exchange unit in which heat exchange occurs between the absorbent after carbon dioxide adsorption and the absorbent after carbon dioxide desorption.

According to one embodiment of the present invention, the absorbent after carbon dioxide adsorption and the absorbent after carbon dioxide desorption may be moved under bubbling fluidized bed conditions and dilute fluidized bed conditions in the heat exchange unit, respectively, and the heat exchange unit may be placed upstream of the sorption column.

According to a further embodiment of the present invention, the absorbent after carbon dioxide adsorption and the absorbent after carbon dioxide desorption may be moved under dilute fluidized bed conditions and bubbling fluidized bed conditions in the heat exchange unit, respectively, and the heat exchange unit may be placed downstream of the sorption column.

According to another embodiment of the present invention, the absorbent after carbon dioxide adsorption and the absorbent after carbon dioxide desorption may be moved under dilute fluidized bed conditions and bubbling fluidized bed conditions in the heat exchange unit, respectively, and the heat exchange unit may be placed upstream of the desorption column.

According to another embodiment of the present invention, the absorbent after carbon dioxide adsorption and the absorbent after carbon dioxide desorption may be moved under bubbling fluidized bed conditions and dilute fluidized bed conditions in the heat exchange unit, respectively, and the heat exchange unit may be placed downstream of the desorption column.

According to another embodiment of the present invention, the carbon dioxide adsorption unit may be provided with cooling means.

According to another embodiment of the present invention, the carbon dioxide desorption unit may be provided with heating means.

According to another embodiment of the present invention, the absorbent after carbon dioxide adsorption and the absorbent after carbon dioxide desorption may be moved in directions opposite to each other in the heat exchange unit.

According to another embodiment of the present invention, the heat exchange unit may have a structure in which tubes through which the absorbent after carbon dioxide desorption is moved are inserted into a tube through which the absorbent after carbon dioxide adsorption is moved or tubes through which the absorbent after carbon dioxide adsorption is moved are inserted into a tube through which the absorbent after carbon dioxide desorption is moved.

According to another embodiment of the present invention, the heat exchange unit may have a structure in which planar passages through which the absorbent after carbon dioxide adsorption is moved are in face-to-face contact with planar passages through which the absorbent after carbon dioxide desorption is moved.

According to another embodiment of the present invention, a carbon dioxide adsorption/desorption unit including the carbon dioxide sorption column, the carbon dioxide desorption column, the carbon dioxide absorbent, and the heat exchange unit may be provided in plurality and heat exchange may occur between the carbon dioxide adsorption/desorption units.

According to another embodiment of the present invention, the carbon dioxide adsorption/desorption units may be filled with carbon dioxide absorbents having different adsorption and/or desorption temperatures.

In order to achieve the second object of the present invention, there is provided a carbon dioxide capture method having a temperature swing adsorption mode for selective separation of carbon dioxide from flue gases, comprising following steps of: allowing an absorbent to adsorb carbon dioxide from flue gases in a carbon dioxide adsorption unit; allowing the absorbent to desorb the adsorbed carbon dioxide in a carbon dioxide desorption unit connected to the carbon dioxide sorption column; and allowing heat exchange to occur between the absorbent after carbon dioxide adsorption and the absorbent after carbon dioxide desorption.

Effects of the Invention

The carbon dioxide capture apparatus of the present invention has the following advantageous effects.

1. The carbon dioxide capture apparatus of the present invention is constructed such that the carbon dioxide absorbent circulates through the carbon dioxide sorption column in which adsorption of carbon dioxide occurs and the carbon dioxide desorption column in which desorption of the adsorbed carbon dioxide occurs and heat is exchangeable between the absorbent after carbon dioxide adsorption and the absorbent after carbon dioxide desorption. Due to this construction, the amount of energy consumed to capture carbon dioxide can be saved.

2. Most (≥80%) sensible heat is exchangeable between the absorbent after carbon dioxide adsorption and the absorbent after carbon dioxide desorption. As a result, energy to be supplied to or removed from the absorbent can be effectively reduced to the level of 8 to 12 J/g. In contrast, an energy of 40 to 60 J/g should be supplied to or removed from absorbents in conventional carbon dioxide capture apparatus.

3. The heat exchange unit can be placed at different locations depending on the characteristics of the carbon dioxide absorbent, achieving improved heat exchange rate.

4. The heat exchange unit is of a multi-tube or multi-plate type without any heat transfer medium, resulting in an improvement in heat exchange efficiency between the absorbent after carbon dioxide adsorption and the absorbent after carbon dioxide desorption.

EXPLANATION OF REFERENCE NUMERALS

Figure 1:
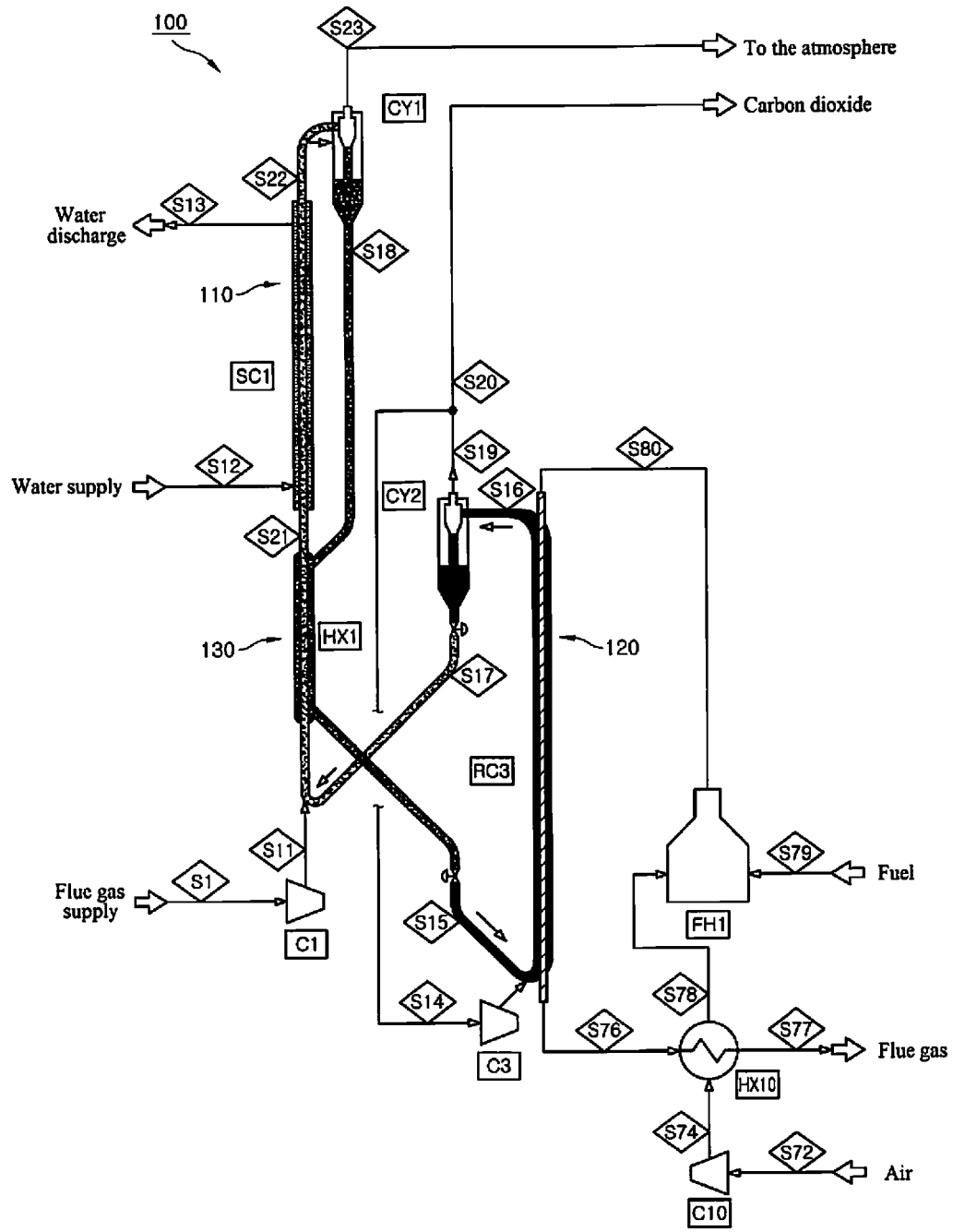
FIG. 1 illustrates a carbon dioxide capture apparatus according to one embodiment of the present invention in which a heat exchange unit is placed upstream of a sorption column.

100: Carbon dioxide capture apparatus
110: Carbon dioxide adsorption unit
120: Carbon dioxide desorption unit
130: Heat exchange unit
200: Carbon dioxide capture apparatus
210: Carbon dioxide adsorption unit
220: Carbon dioxide desorption unit
230: Heat exchange unit
300: Carbon dioxide capture apparatus
310: Carbon dioxide adsorption unit
320: Carbon dioxide desorption unit
330: Heat exchange unit
400: Carbon dioxide capture apparatus
410: Carbon dioxide adsorption unit
420: Carbon dioxide desorption unit
430: Heat exchange unit
500: Multi-stage carbon dioxide capture apparatus
530a, 530b, 530c: Heat exchangers
600: Multi-stage carbon dioxide capture apparatus
630a, 630b, 630c: Heat exchangers
SC1-SC3: Carbon dioxide sorption columns
RC1-RC3: Carbon dioxide desorption columns
C1-C10: Compressors or blowers
CY1-CY6: Cyclones
FH1: Furnace heater
HX1-HX10: Heat exchangers
S1-S46: Stream numbers
V1-V3: Flow control valves

MODE FOR CARRYING OUT THE INVENTION

The present invention will now be described in detail.

The present invention provides a carbon dioxide capture apparatus having a temperature swing adsorption mode for selective separation of carbon dioxide from flue gases, comprising: a carbon dioxide sorption column including a carbon dioxide adsorption unit in which adsorption of carbon dioxide from flue gases occurs; a carbon dioxide desorption column connected to the carbon dioxide sorption column and including a carbon dioxide desorption unit in which desorption of the adsorbed carbon dioxide occurs; a carbon dioxide absorbent repeatedly adsorbing and desorbing carbon dioxide while circulating through the carbon dioxide sorption column and the carbon dioxide desorption column; and a heat exchange unit in which heat exchange occurs between the absorbent after carbon dioxide adsorption and the absorbent after carbon dioxide desorption.

The present invention relates to an apparatus and method for capturing carbon dioxide contained in flue gases from a power plant or combustion furnace. Specifically, the apparatus and method use an adsorption-desorption cycle process based on the concept of temperature swing adsorption in a circulating fluidized bed reactor through which an absorbent circulates. According to the apparatus and method of the present invention, when the absorbent circulates through a sorption column and a desorption column, its sensible heat exchange can be induced without any heat exchange medium, achieving high energy efficiency by inducing direct heat exchange process. The carbon dioxide capture apparatus of the present invention is constructed to enable heat exchange between the cold absorbent escaping from the sorption column and the hot absorbent escaping from the desorption column. This construction greatly reduces the burden to cool the absorbent in the sorption column and the burden to heat the absorbent in the desorption column, contributing to a considerable reduction in the amount of energy required for carbon dioxide capture.

In a circulating fluidized bed process for carbon dioxide capture process by an adsorption-desorption cycle using a dry absorbent, a large amount of sensible heat should be removed or supplied to facilitate adsorption and desorption of carbon dioxide when the absorbent circulates through a sorption column and a desorption column. Thus, corresponding energy should be removed from the absorbent or supplied from the outside. The sensible heat of most absorbents is in the range of 0.8 to 1.2 J/g·K, which is slightly different depending on the kind of the absorbents. Since absorption temperature and desorption temperature of a general absorbent are different by at least 50° C., an energy of 40 to 60 J/g should be removed from or supplied to the absorbent, which is a cause of increased operating cost. In the heat exchange unit of the carbon dioxide capture apparatus according to the present invention, at least 80% of the sensible heat can be exchanged between the absorbent after carbon dioxide adsorption and the absorbent after carbon dioxide desorption. As a result, energy to be supplied to or removed from the absorbent can be effectively reduced to the level of 8 to 12 J/g.

As illustrated in FIGS. 1 to 4, the carbon dioxide capture apparatus of the present invention may be operated in four different heat exchange modes depending on the characteristics of the absorbent to minimize the cost of energy consumed to capture carbon dioxide. The effects of the present invention are more profound when a larger amount of the absorbent circulates. This concept is extendable and applicable to energy exchangeable multi-stage carbon dioxide capture processes using various kinds of carbon dioxide absorbents whose adsorption temperature stages are different, as well as single-stage carbon dioxide capture processes by an adsorption-desorption cycle using a single carbon dioxide absorbent.

The apparatus of the present invention is based on a carbon dioxide capture process by an adsorption-desorption cycle in a circulating fluidized bed reactor. In the apparatus of the present invention, a heat exchanger may be installed at four different locations depending on the characteristics of the absorbent to direct exchange sensible heat between the absorbent after carbon dioxide adsorption and the absorbent after carbon dioxide desorption, as illustrated in FIGS. 1 to 4. The possible locations of the heat exchanger are summarized in Table 1.

TABLE 1

(Configuration of the heat exchanger for direct sensible heat exchange between the absorbent after carbon dioxide adsorption and the absorbent after carbon dioxide desorption)

| Location of the heat exchanger | (Fluid from sorption column) - (Fluid from desorption column) Operating modes |
|---|---|
| Upstream of the sorption column | (Bubbling fluidized bed condition) - (Dilute fluidized bed condition) |
| Downstream of sorption column | (Dilute fluidized bed condition) - (Bubbling fluidized bed condition) |
| Upstream of desorption column | (Dilute fluidized bed condition) - (Bubbling fluidized bed condition) |
| Downstream of desorption column | (Bubbling fluidized bed condition) - (Dilute fluidized bed condition) |

FIG. 1 illustrates a carbon dioxide capture apparatus according to one embodiment of the present invention in which a heat exchange unit is placed upstream of a sorption column. The terms "upstream" and "downstream" used herein refer to regions divided based on the circulation pathway of the carbon dioxide absorbent. For example, the "upstream of a sorption column" refers to the region through which the carbon dioxide absorbent passes before entering the sorption column, and the "downstream of a sorption column" refers to the region through which the carbon dioxide absorbent passes after escaping from the sorption column. Referring to FIG. 1, the carbon dioxide capture apparatus 100 includes a carbon dioxide adsorption unit 110, a carbon dioxide desorption unit 120, and a heat exchange unit 130. The carbon dioxide adsorption unit 110 and the carbon dioxide desorption unit 120 are connected to each other. A carbon dioxide absorbent is filled in the carbon dioxide adsorption unit 110 and the carbon dioxide desorption unit 120 to repeatedly adsorb and desorb carbon dioxide while circulating through the carbon dioxide adsorption unit 110 and the carbon dioxide desorption unit 120. A flue gas is supplied to the bottom of the carbon dioxide adsorption unit 110. Carbon dioxide is adsorbed to the absorbent in the carbon dioxide adsorption unit 110, which is an inner tube of a sorption column SC1. The flue gas free from carbon dioxide is released to the outside. The absorbent after carbon dioxide adsorption passes through an outer tube of the heat exchange unit 130 via a stream number S18 and passes through the carbon dioxide desorption unit 120, an outer tube of a desorption column RC3, via a stream number S15. The adsorbed carbon dioxide is desorbed from the carbon dioxide absorbent in the carbon dioxide desorption unit 120. The desorbed carbon dioxide is released to the outside. The absorbent after carbon dioxide desorption passes through an inner tube of the heat exchange unit 130 via a stream number S17 and again circulates through the carbon dioxide adsorption unit 110. At this time, the absorbent after carbon dioxide desorption and the absorbent after carbon dioxide adsorption are moved in different directions each other through the inner and outer tubes of the heat exchange unit 130, respectively, where heat exchange takes places therebetween. The carbon dioxide adsorption unit is cooled by water circulation and the carbon dioxide desorption unit is heated by a heater. In the embodiment of FIG. 1, the heat exchange unit is placed upstream of the sorption column for sensible heat exchange between the absorbent after carbon dioxide adsorption and the absorbent after carbon dioxide desorption. The absorbent escaping from the sorption column after carbon dioxide adsorption and the absorbent escaping from the desorption column after carbon dioxide desorption exchange sensible heat while flowing in counter-current directions through a heat exchanger HX1. The concentration of the absorbent separated in a cyclone CY1 of the sorption column maintains high bubbling fluidized bed conditions in the range of 15 to 70 vol %. Within this range, the absorbent after carbon dioxide adsorption can exchange heat through the walls of the heat exchanger. The concentration of the absorbent separated in a cyclone CY2 of the desorption column maintains dilute fluidized bed conditions in the range of 0.5 to 5 vol %. Within this range, the absorbent after carbon dioxide desorption can exchange heat before entering the sorption column. This construction is advantageous when the absorbent does not rapidly lose its ability to absorb carbon dioxide despite the increasing temperature of the sorption column upon carbon dioxide adsorption and has the advantage of higher sensible heat exchange rate than a construction in which the heat exchange unit is placed downstream of the sorption column.

Figure 2:
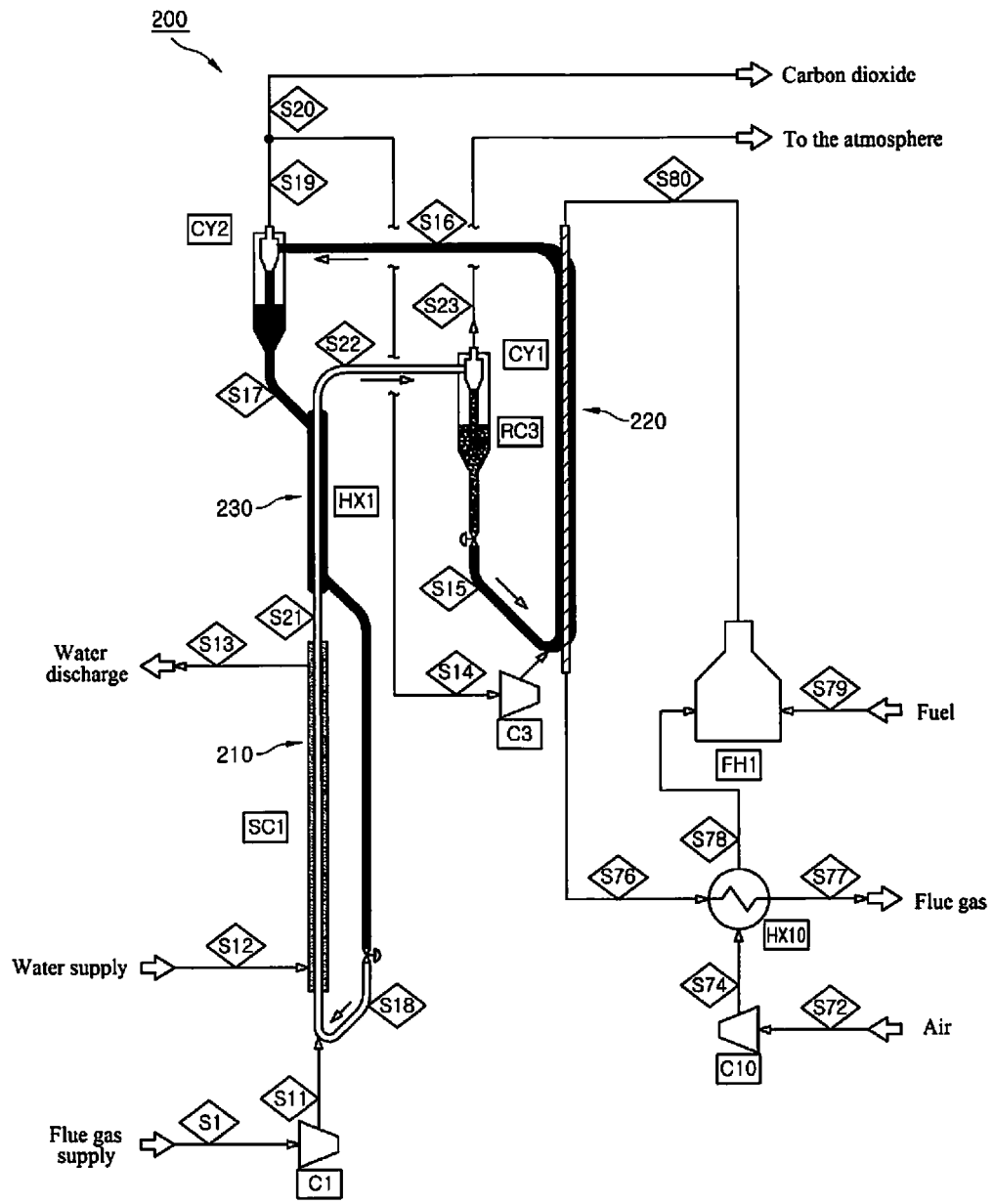
FIG. 2 illustrates a carbon dioxide capture apparatus according to one embodiment of the present invention in which a heat exchange unit is placed downstream of a sorption column.

FIG. 2 illustrates a carbon dioxide capture apparatus according to one embodiment of the present invention in which a heat exchange unit is placed downstream of a sorption column. Referring to FIG. 2, the carbon dioxide capture apparatus 200 includes a carbon dioxide adsorption unit 210, a carbon dioxide desorption unit 220, and a heat exchange unit 230. The carbon dioxide adsorption unit 210 and the carbon dioxide desorption unit 220 are connected to each other. A carbon dioxide absorbent is filled in the carbon dioxide adsorption unit 210 and the carbon dioxide desorption unit 220 to repeatedly adsorb and desorb carbon dioxide while circulating through the carbon dioxide adsorption unit 210 and the carbon dioxide desorption unit 220. A flue gas is supplied to the bottom of the carbon dioxide adsorption unit 210. Carbon dioxide is adsorbed to the absorbent in the carbon dioxide adsorption unit 210, which is an inner tube of a sorption column SC1. The flue gas free from carbon dioxide passes through the heat exchange unit 230 and is released to the outside. The absorbent after carbon dioxide adsorption passes through an inner tube of the heat exchange unit 230 and enters the carbon dioxide desorption unit 220, an outer tube of a desorption column RC3, via stream numbers S22 and S15. The adsorbed carbon dioxide is desorbed from the carbon dioxide absorbent in the carbon dioxide desorption unit 220. The absorbent after carbon dioxide desorption passes through an outer tube of the heat exchange unit 230 via a stream number S16 and again circulates through the carbon dioxide adsorption unit 210. At this time, the absorbent after carbon dioxide desorption and the absorbent after carbon dioxide adsorption are moved in different directions each other through the outer and inner tubes of the heat exchange unit 230, respectively, where heat exchange takes places therebetween. In the embodiment of FIG. 2, a heat exchanger is installed downstream of the sorption column for sensible heat exchange between the absorbent after carbon dioxide adsorption and the absorbent after carbon dioxide desorption. The absorbent escaping from the sorption column after carbon dioxide adsorption and the absorbent escaping from the desorption column after carbon dioxide desorption exchange sensible heat while flowing in counter-current directions through the heat exchanger FIX 1. The concentration of the absorbent escaping from the sorption column immediately after carbon dioxide adsorption maintains dilute fluidized bed conditions in the range of 0.5 to 5 vol %. Within this range, the absorbent after carbon dioxide adsorption can exchange heat through the walls of the heat exchanger. The concentration of the absorbent separated in a cyclone CY2 of the desorption column maintains high bubbling fluidized bed conditions in the range of 15 to 70 vol %. Within this range, the absorbent after carbon dioxide desorption can exchange heat. This construction is advantageous when the absorbent rapidly loses its ability to absorb carbon dioxide with increasing temperature of the sorption column upon carbon dioxide adsorption and has the disadvantage of lower sensible heat exchange rate than a construction in which the heat exchange unit is placed upstream of the sorption column.

Figure 3:
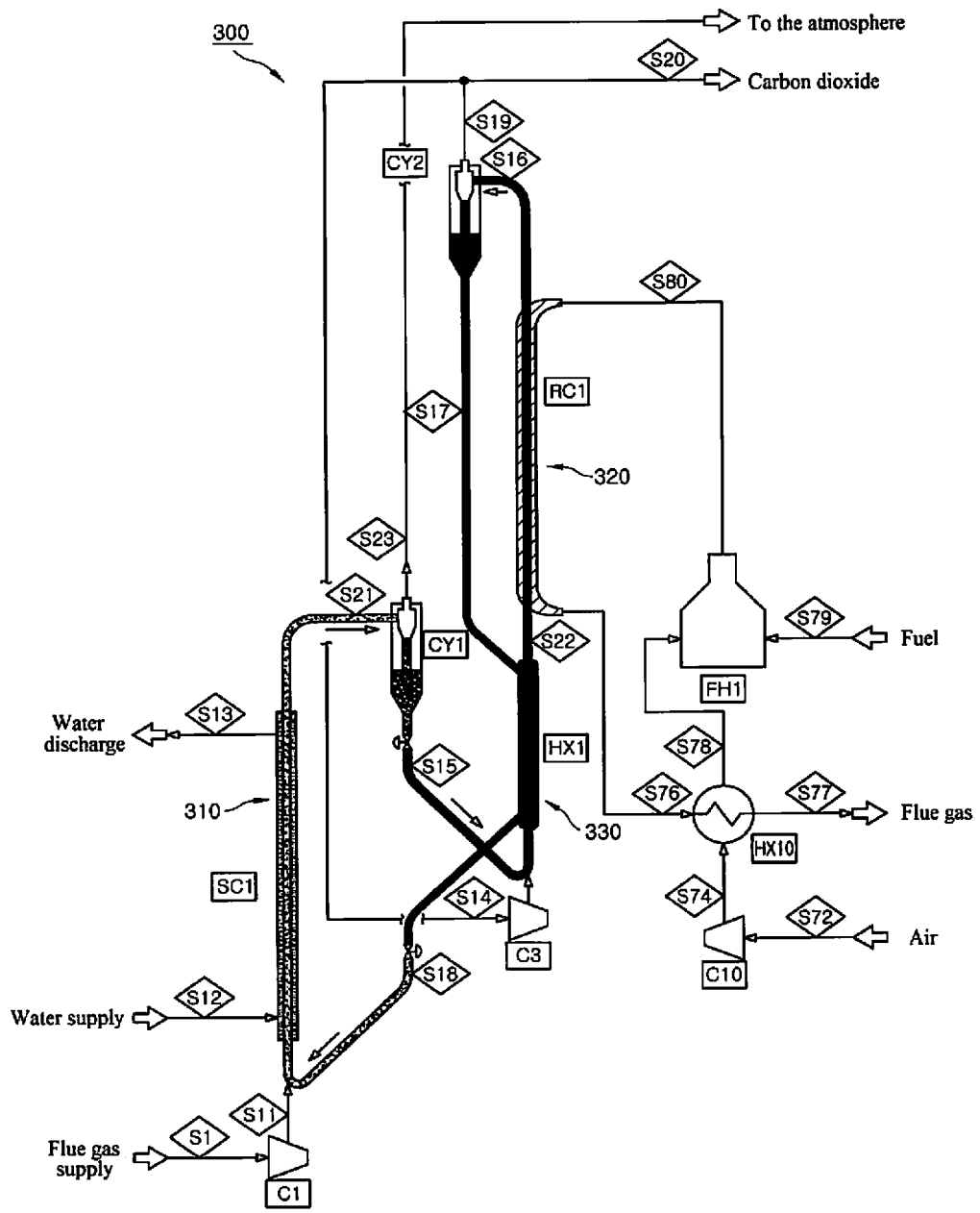
FIG. 3 illustrates a carbon dioxide capture apparatus according to one embodiment of the present invention in which a heat exchange unit is placed upstream of a desorption column.

FIG. 3 illustrates a carbon dioxide capture apparatus according to one embodiment of the present invention in which a heat exchange unit is placed upstream of a desorption column. Referring to FIG. 3, the carbon dioxide capture apparatus 300 includes a carbon dioxide adsorption unit 310, a carbon dioxide desorption unit 320, and a heat exchange unit 330. The carbon dioxide adsorption unit 310 and the carbon dioxide desorption unit 320 are connected to each other. A carbon dioxide absorbent is filled in the carbon dioxide adsorption unit 310 and the carbon dioxide desorption unit 320 to repeatedly adsorb and desorb carbon dioxide while circulating through the carbon dioxide adsorption unit 310 and the carbon dioxide desorption unit 320. A flue gas is supplied to the bottom of the carbon dioxide adsorption unit 310. Carbon dioxide is adsorbed to the absorbent in the carbon dioxide adsorption unit 310, which is an inner tube of a sorption column SC1. The flue gas free from carbon dioxide is released to the outside. The absorbent after carbon dioxide adsorption passes through an inner tube of the heat exchange unit 330 via stream numbers S21 and S15 and passes through the carbon dioxide desorption unit 320, an inner tube of a desorption column RC1, via a stream number S22. The adsorbed carbon dioxide is desorbed from the carbon dioxide absorbent in the carbon dioxide desorption unit 320. The absorbent after carbon dioxide desorption passes through an outer tube of the heat exchange unit 330 via a stream number S17 and again circulates through the carbon dioxide adsorption unit 310. At this time, the absorbent after carbon dioxide desorption and the absorbent after carbon dioxide adsorption are moved in different directions each other through the outer and inner tubes of the heat exchange unit 330, respectively, where heat exchange takes places therebetween. In the embodiment of FIG. 3, a heat exchanger is installed upstream of the desorption column for sensible heat exchange between the absorbent after carbon dioxide adsorption and the absorbent after carbon dioxide desorption. The absorbent escaping from the sorption column after carbon dioxide adsorption and the absorbent escaping from the desorption column after carbon dioxide desorption exchange sensible heat while flowing in counter-current directions through the heat exchanger HX1. The concentration of the absorbent separated in a cyclone CY1 of the sorption column maintains dilute fluidized bed conditions in the range of 0.5 to 5 vol %. Within this range, the absorbent after carbon dioxide adsorption can exchange heat through the walls of the heat exchanger before entering the desorption column. The concentration of the absorbent separated in a cyclone CY2 of the desorption column maintains high bubbling fluidized bed conditions in the range of 15 to 70 vol %. Within this range, the absorbent after carbon dioxide desorption can exchange heat. This construction is advantageous when the absorbent after carbon dioxide adsorption rapidly desorbs the adsorbed carbon dioxide with increasing temperature and has the advantage of higher sensible heat exchange rate than a construction in which the heat exchange unit is placed downstream of the desorption column.

Figure 4:
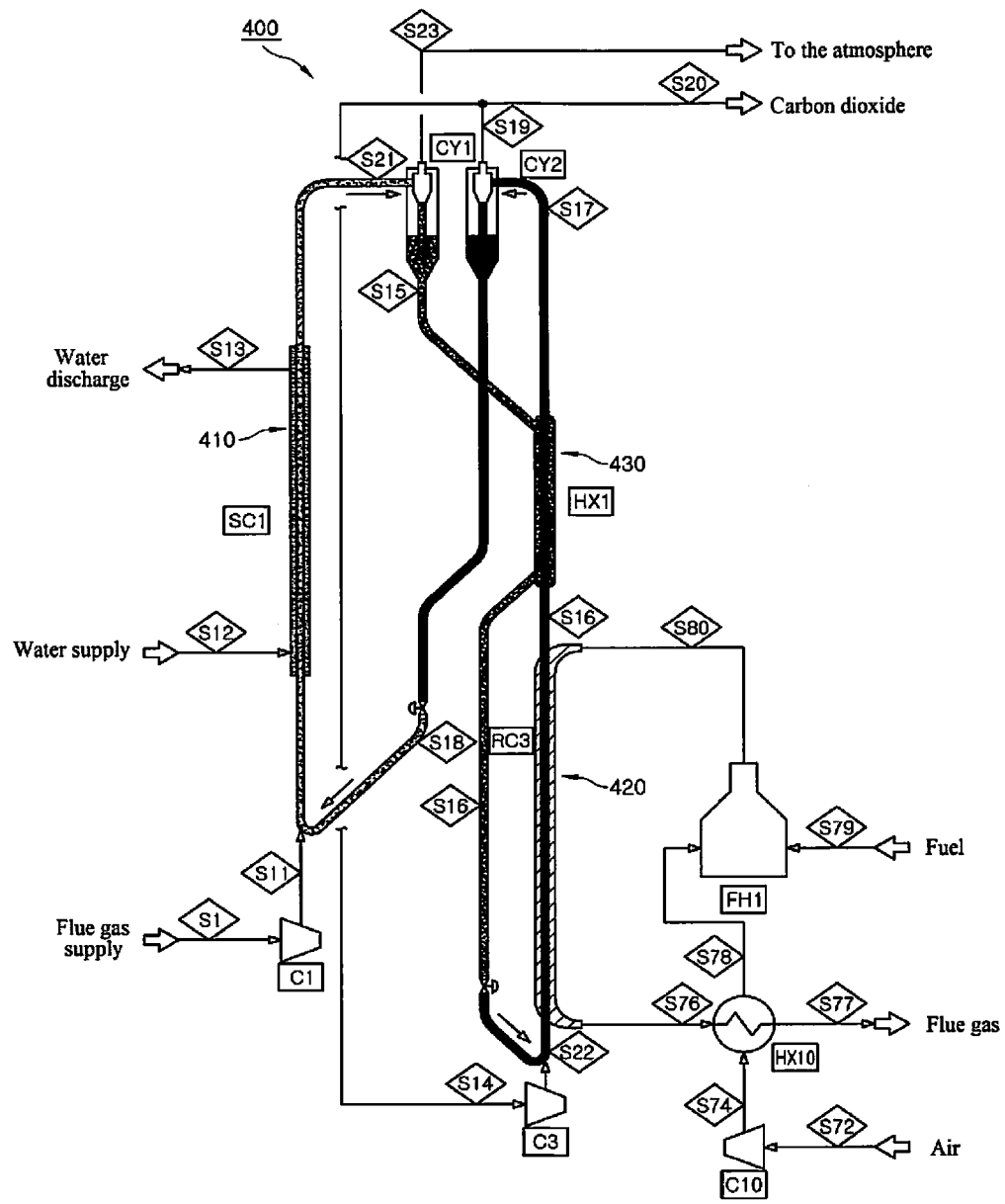
FIG. 4 illustrates a carbon dioxide capture apparatus according to one embodiment of the present invention in which a heat exchange unit is placed downstream of a desorption column.

FIG. 4 illustrates a carbon dioxide capture apparatus according to one embodiment of the present invention in which a heat exchange unit is placed downstream of a desorption column. Referring to FIG. 4, the carbon dioxide capture apparatus 400 includes a carbon dioxide adsorption unit 410, a carbon dioxide desorption unit 420, and a heat exchange unit 430. The carbon dioxide adsorption unit 410 and the carbon dioxide desorption unit 420 are connected to each other. A carbon dioxide absorbent is filled in the carbon dioxide adsorption unit 410 and the carbon dioxide desorption unit 420 to repeatedly adsorb and desorb carbon dioxide while circulating through the carbon dioxide adsorption unit 410 and the carbon dioxide desorption unit 420. A flue gas is supplied to the bottom of the carbon dioxide adsorption unit 410, which is an inner tube of a sorption column SC1. Carbon dioxide is adsorbed to the absorbent in the carbon dioxide adsorption unit 410 and the flue gas free from carbon dioxide is released to the outside. The absorbent after carbon dioxide adsorption passes through an outer tube of the heat exchange unit 430 via stream numbers S21 and S15 and passes through the carbon dioxide desorption unit 420, an inner tube of a desorption column RC3, via a stream number S22. The adsorbed carbon dioxide is desorbed from the carbon dioxide absorbent in the carbon dioxide desorption unit 420. The absorbent after carbon dioxide desorption passes through an inner tube of the heat exchange unit 430 via a stream number S16 and again circulates through the carbon dioxide adsorption unit 410. At this time, the absorbent after carbon dioxide desorption and the absorbent after carbon dioxide adsorption are moved in different directions each other through the inner and outer tubes of the heat exchange unit 430, respectively, where heat exchange takes places therebetween. In the embodiment of FIG. 4, a heat exchanger is installed downstream of the desorption column for sensible heat exchange between the absorbent after carbon dioxide adsorption and the absorbent after carbon dioxide desorption. The absorbent escaping from the sorption column after carbon dioxide adsorption and the absorbent escaping from the desorption column after carbon dioxide desorption exchange sensible heat while flowing in counter-current directions through the heat exchanger HX1. The concentration of the absorbent separated in a cyclone CY1 of the sorption column maintains high bubbling fluidized bed conditions in the range of 15 to 70 vol %. Within this range, the absorbent after carbon dioxide adsorption can exchange heat through the walls of the heat exchanger before entering the desorption column. The concentration of the absorbent escaping from the desorption column immediately after carbon dioxide desorption maintains dilute fluidized bed conditions in the range of 0.5 to 5 vol %. Within this range, the absorbent after carbon dioxide desorption can exchange heat. This construction is advantageous when the absorbent after carbon dioxide adsorption does not rapidly readsorb carbon dioxide despite drop in temperature and has the disadvantage of lower sensible heat exchange rate than a construction in which the heat exchange unit is placed upstream of the desorption column.

As discussed in the embodiments of FIGS. 1 to 4, the sorption column and the regeneration column of each carbon dioxide capture apparatus consist of a combination of bubbling fluidized bed-dilute fluidized bed or dilute fluidized bed-bubbling fluidized bed. This combination has the problem of low heat exchange efficiency. Thus, the heat exchanger of each carbon dioxide capture apparatus is structurally designed to have a large heat exchange area, which facilitates direct heat exchange.

Figure 5:
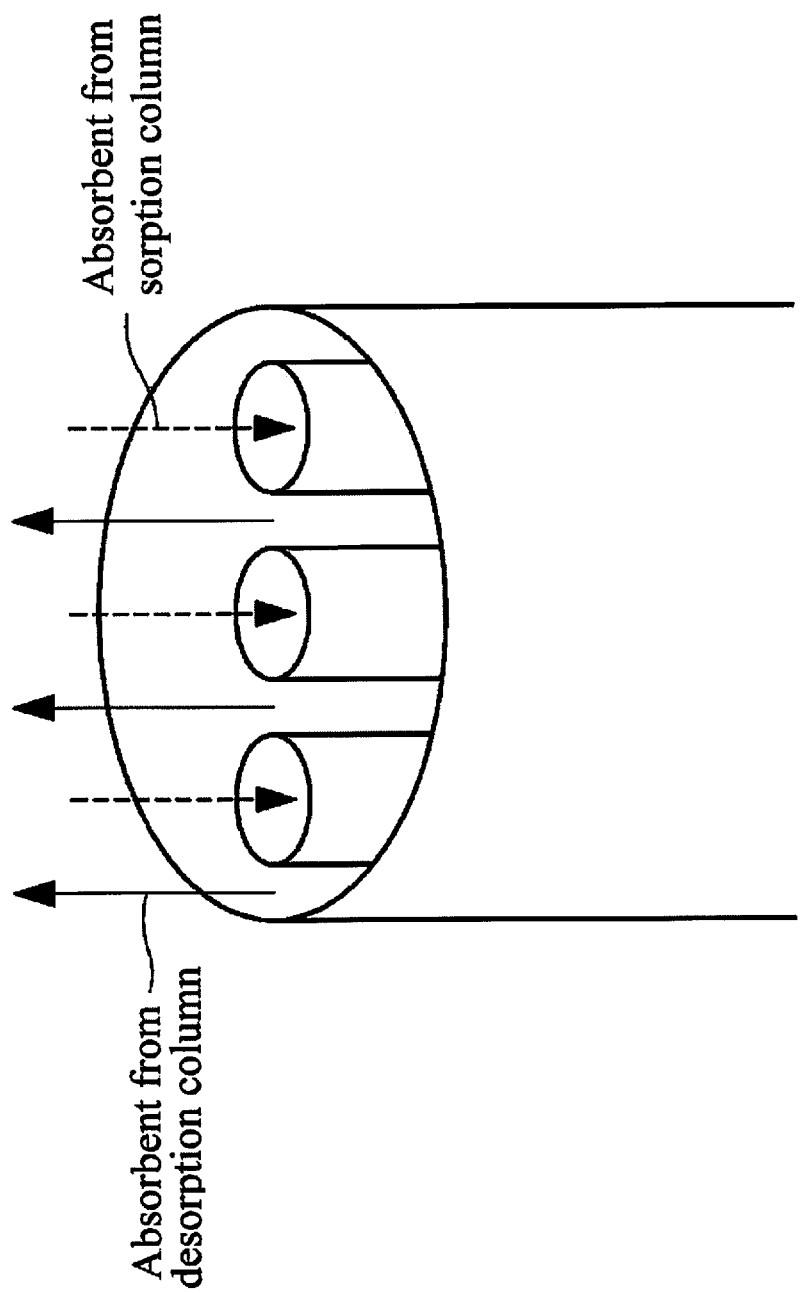
FIG. 5 illustrates a multi-tube type heat exchanger applied to a carbon dioxide capture apparatus of the present invention.
Figure 6:
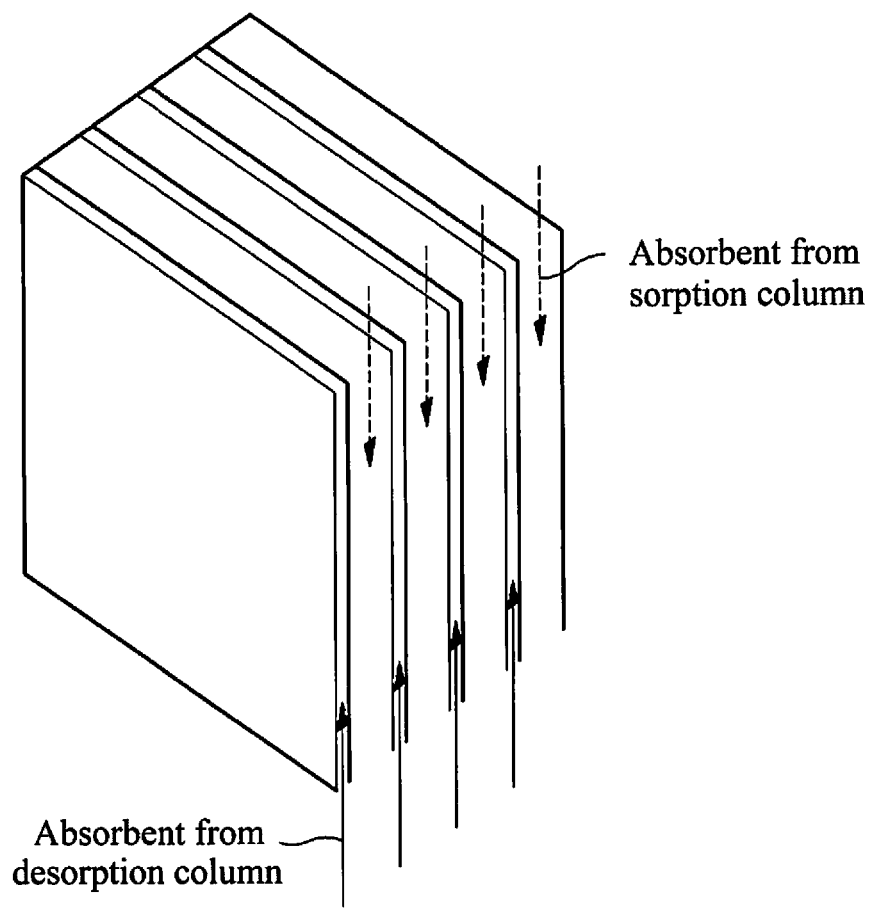
FIG. 6 illustrates a multi-plate type heat exchanger applied to a carbon dioxide capture apparatus of the present invention.

FIGS. 5 and 6 illustrate the constructions of a multi-tube heat exchanger and a multi-plate type heat exchanger applicable to the carbon dioxide capture apparatus of the present invention, respectively.

Referring to FIG. 5, the absorbent after carbon dioxide desorption in the desorption column is moved upward along an outer tube whose diameter is larger and the absorbent after carbon dioxide adsorption in the sorption column is moved downward through a plurality of inner tubes. This structure increases the surface area of the inner tubes, leading to an increase in the efficiency of heat exchange between the absorbent after carbon dioxide desorption and the absorbent after carbon dioxide adsorption. The absorbent passing through the inner tubes is interchangeable with the absorbent passing through the outer tube.

Referring to FIG. 6, the heat exchanger consists of plates, each having an internal space and a small thickness. The absorbent after carbon dioxide desorption passes through the internal spaces of the plates and the absorbent after carbon dioxide adsorption passes through spaces defined by the plates. The internal passages of the plates are disposed alternately and in face-to-face contact with the passages defined by the plates. This structure increases the area where the absorbent after carbon dioxide adsorption exchanges heat with the absorbent after carbon dioxide desorption, leading to an increase in heat exchange efficiency.

Figure 9:
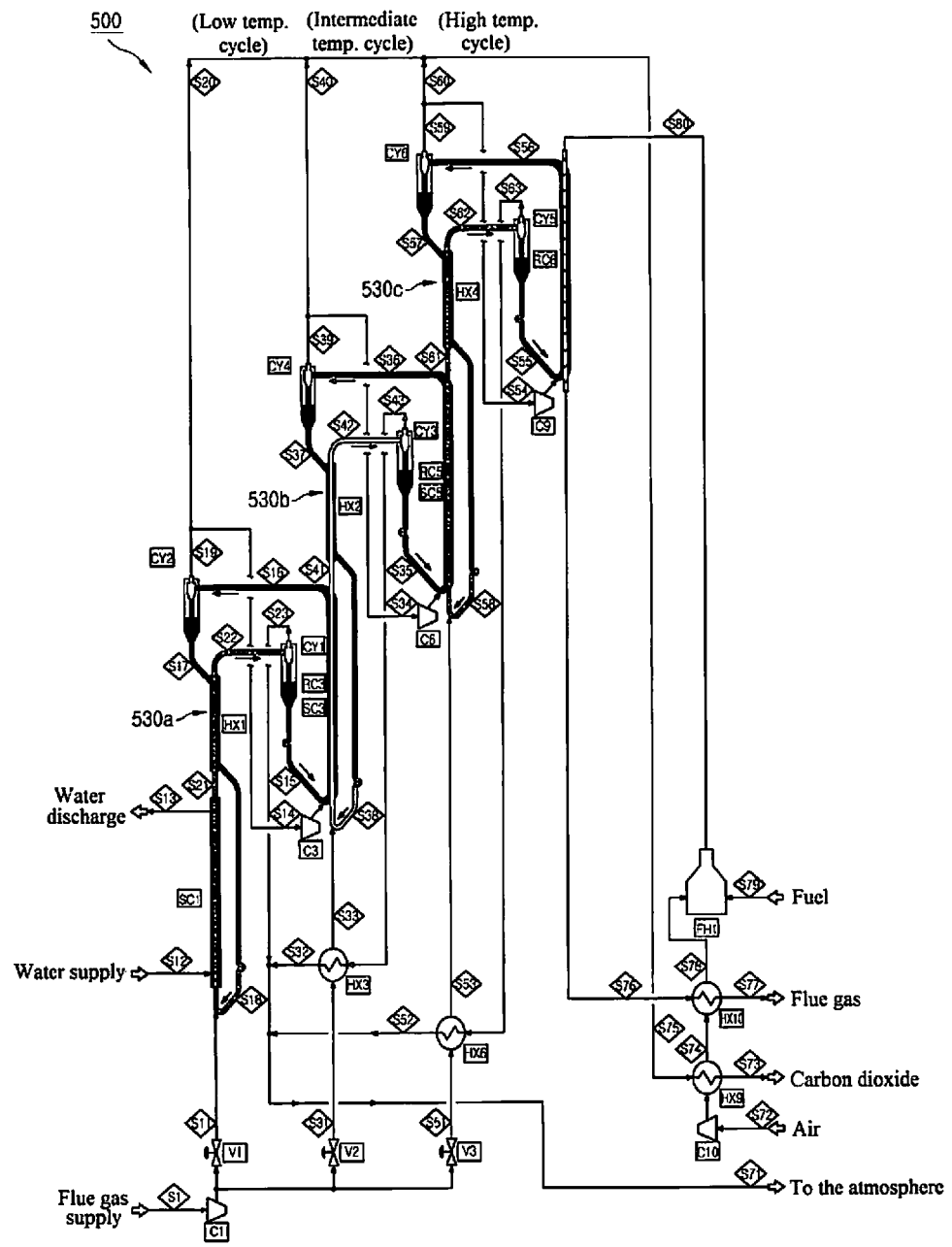
FIG. 9 illustrates a multi-stage carbon dioxide capture apparatus according to one embodiment of the present invention in which heat exchange units are disposed downstream of sorption columns.
Figure 10:
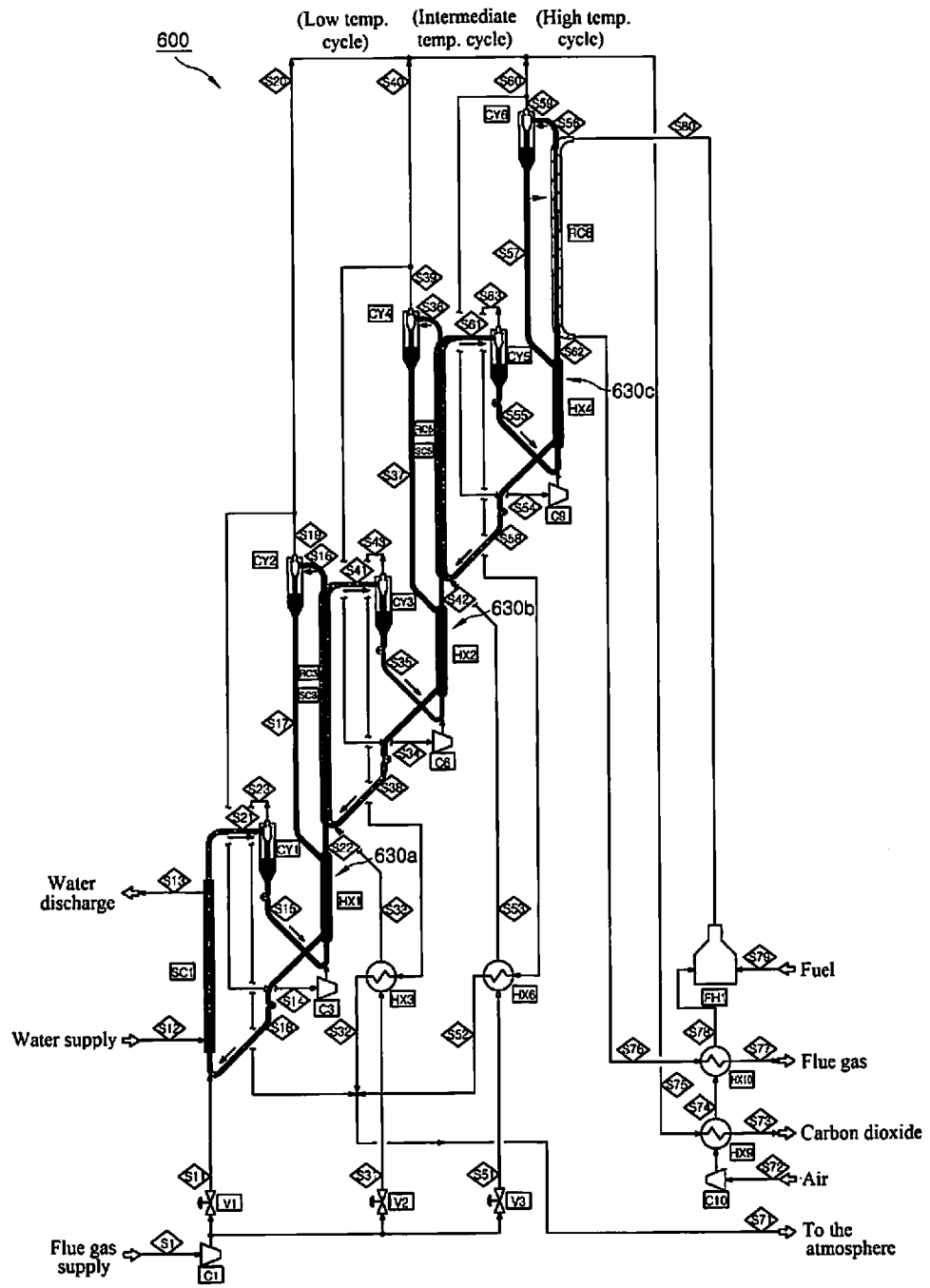
FIG. 10 illustrates a multi-stage carbon dioxide capture apparatus according to one embodiment of the present invention in which heat exchange units are disposed upstream of desorption columns.

According to the present invention, sensible heat is effectively exchanged between the absorbent after carbon dioxide adsorption and the absorbent after carbon dioxide desorption in the single-stage circulating fluidized bed reactors. Such sensible heat exchange occurs more effectively in multi-stage circulating fluidized bed processes for carbon dioxide capture in which adsorption heat and desorption heat of absorbents operating at different temperatures are exchanged, as illustrated in FIGS. 9 and 10. In this case, heat exchangers capable of directly exchanging sensible heat between the absorbents can be installed to minimize the cost of energy consumed to capture carbon dioxide.

Figure 7:
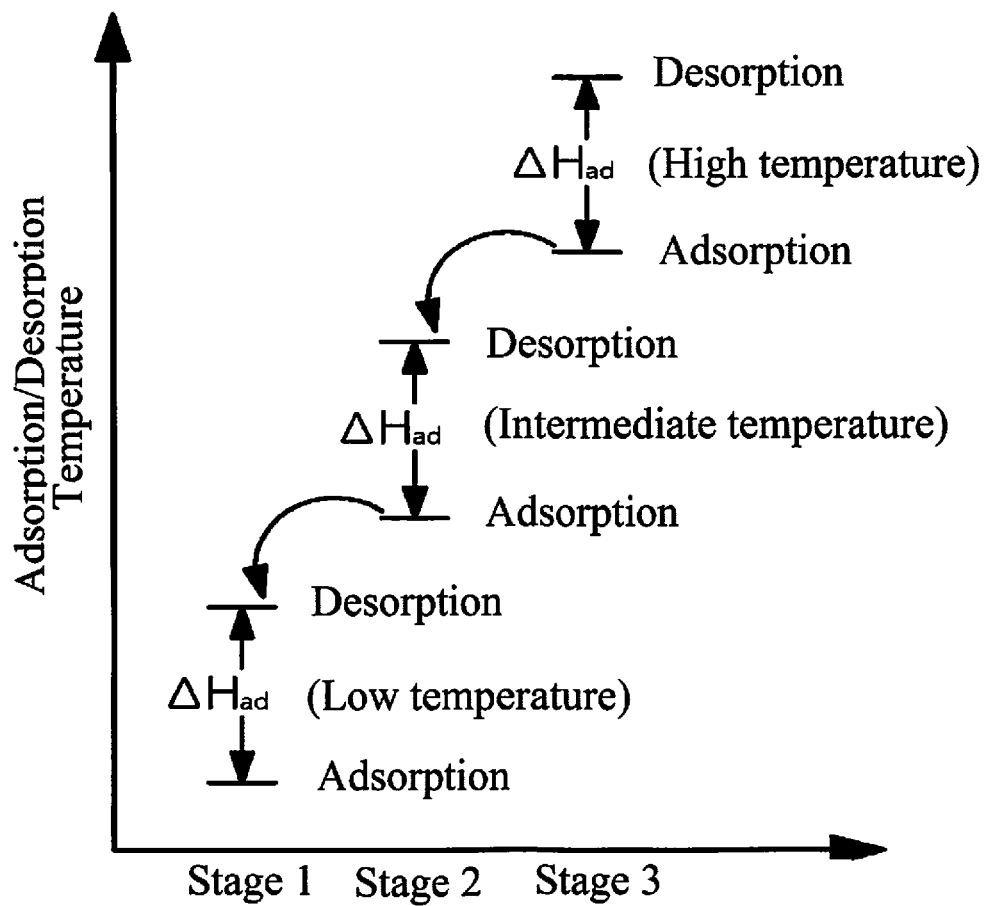
FIGS. 7 and 8 are diagrams for explaining the operating principle of a multi-stage carbon dioxide capture apparatus according to one embodiment of the present invention.
Figure 8:
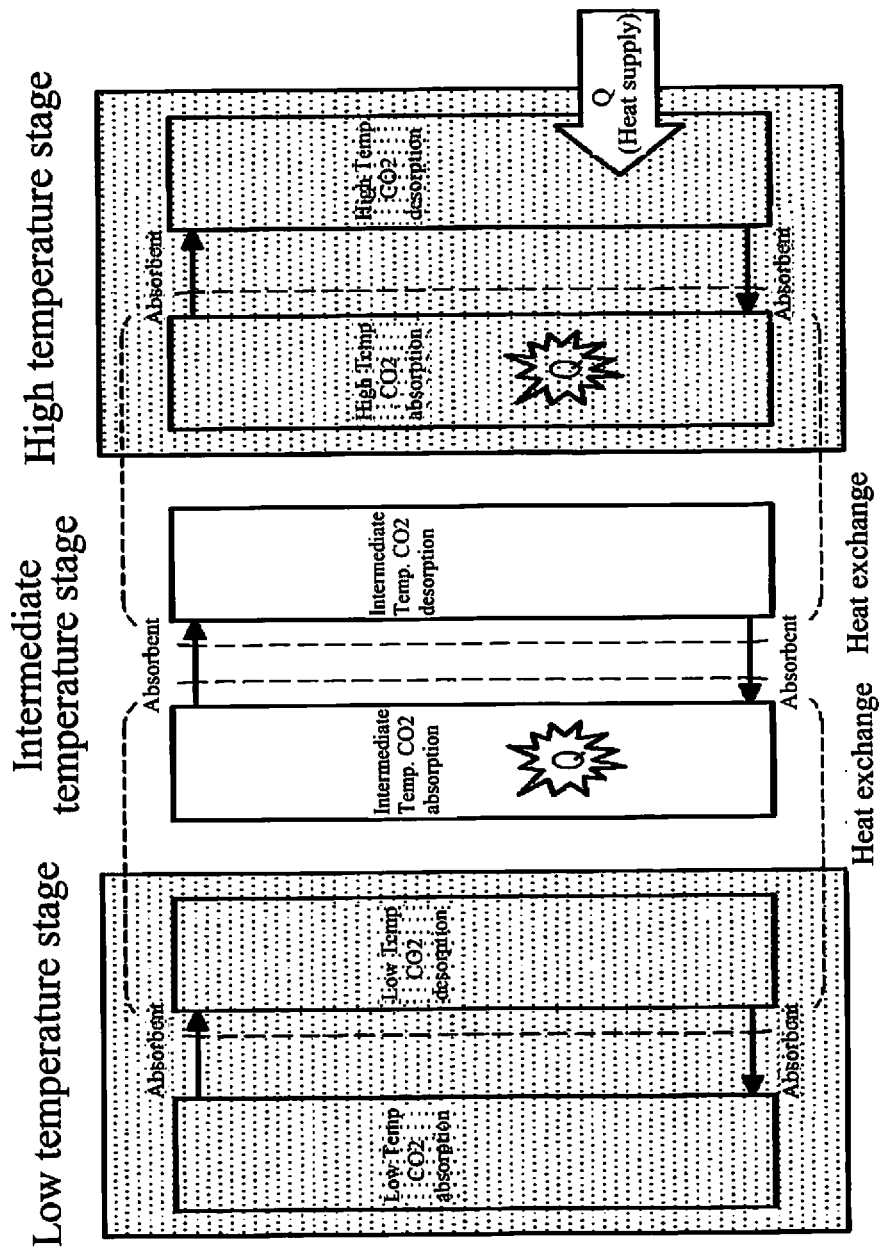

FIGS. 7 and 8 are diagrams for explaining the concept of using heat of carbon dioxide adsorption as heat necessary for the desorption of carbon dioxide in a carbon dioxide adsorption-desorption cycle consisting of a low temperature stage, an intermediate temperature stage, and a high temperature stage in accordance with a multi-stage carbon dioxide capture method according to one embodiment of the present invention. Referring to FIGS. 7 and 8, carbon dioxide adsorption/desorption units in which carbon dioxide is adsorbed and desorbed at different temperatures are multi-stage connected in series. This connection enables the transfer of energy between the carbon dioxide adsorption/desorption units in which carbon dioxide adsorption and desorption occurs. That is, absorbents having different adsorption and desorption temperatures are filled in the high temperature, intermediate temperature, and low temperature carbon dioxide adsorption/desorption units, adsorption heat is generated in the course of adsorbing carbon dioxide and is transferred to the adjacent stage to induce the desorption of carbon dioxide or reduce the amount of heat necessary for desorption. Specifically, adsorption heat is emitted when the absorbent adsorbs carbon dioxide in the high temperature stage and is used as energy necessary for the absorbent in the intermediate temperature stage to desorb the carbon dioxide, and adsorption heat is emitted when the absorbent adsorbs carbon dioxide in the intermediate temperature stage and is used as energy necessary for the absorbent in the low temperature stage to desorb the carbon dioxide. The use of energy generated during adsorption of carbon dioxide as energy necessary for the desorption of carbon dioxide can reduce the cost of energy consumed to desorb the carbon dioxide.

According to the energy exchangeable multi-stage fluidized bed solid phase separation process for carbon dioxide capture, in each of the low, intermediate, and high temperature stages, the absorbent escaping from the sorption column after carbon dioxide adsorption enters the desorption column to desorb the absorbed carbon dioxide. At this time, heating of the absorbent after carbon dioxide adsorption to the desorption temperature is required for carbon dioxide desorption. Meanwhile, the hot absorbent escaping from the desorption column after carbon dioxide desorption should be cooled to the adsorption temperature in order for the absorbent to readsorb carbon dioxide in the sorption column. At this time, heat exchange between the lower temperature absorbent escaping from the sorption column and the higher temperature absorbent escaping from the desorption column can save energy cost for heating the absorbent escaping from the sorption column and cooling the absorbent escaping from the desorption column. The energy efficiency of the entire process is determined depending on how efficient the heat exchange is.

FIGS. 9 and 10 illustrate carbon dioxide capture processes consisting of multi-stage carbon dioxide adsorption-desorption cycles. As illustrated in FIGS. 9 and 10, heat exchangers are installed downstream of the sorption columns and upstream of the desorption columns for direct sensible heat exchange between absorbents after carbon dioxide adsorption and absorbents after carbon dioxide desorption, respectively.

FIG. 9 illustrates a multi-stage carbon dioxide capture apparatus according to one embodiment of the present invention in which heat exchange units are disposed downstream of sorption columns. The three-stage carbon dioxide capture apparatus illustrated in FIG. 9 is operated in direct adsorption heat exchange and sensible heat exchange modes and includes three carbon dioxide adsorption/desorption units in which carbon dioxide adsorption and desorption occurs. Each of the carbon dioxide adsorption/desorption units uses a carbon dioxide absorbent operating at a high, intermediate or low temperature (the concept of temperature is relative). Heat exchange occurs between the adjacent carbon dioxide adsorption/desorption units. The carbon dioxide capture apparatus uses an absorption-desorption process in a direct heat exchange mode and consists of low, intermediate, and high temperature stages in which sorption columns and desorption columns are dilute fluidized bed reactors. Sensible heat exchangers 530a, 530b, and 530c for direct heat exchange between the absorbents are arranged downstream of the respective sorption columns so that the cost of energy consumed to capture carbon dioxide can be minimized. This construction is very advantageous when the absorbents do not readily desorb the adsorbed carbon dioxide even at the increased temperature after carbon dioxide adsorption.

FIG. 10 illustrates a multi-stage carbon dioxide capture apparatus according to one embodiment of the present invention in which heat exchange units are disposed upstream of desorption columns. The three-stage carbon dioxide capture apparatus illustrated in FIG. 10 is operated in direct adsorption heat exchange and sensible heat exchange modes and includes three carbon dioxide adsorption/desorption units in which carbon dioxide adsorption and desorption occurs. Each of the carbon dioxide adsorption/desorption units uses a carbon dioxide absorbent operating at a high, intermediate or low temperature (the concept of temperature is relative). Heat exchange occurs between the adjacent carbon dioxide adsorption/desorption units. The carbon dioxide capture apparatus uses an absorption-desorption process in a direct heat exchange mode and consists of low, intermediate, and high temperature stages in which sorption columns and desorption columns are dilute fluidized bed reactors. Sensible heat exchangers 630a, 630b, and 630c for direct heat exchange between the absorbents are arranged upstream of the respective desorption columns, so that the cost of energy consumed to capture carbon dioxide can be minimized. This construction is very advantageous when the absorbents readily desorb the adsorbed carbon dioxide at the increased temperature after carbon dioxide adsorption.

Although the technical spirit of the present invention has been described with reference to the foregoing embodiments, those skilled in the art will appreciate that many variations and modifications are possible without departing from the essential features of the present invention. Therefore, the embodiments are merely illustrative and are not to be considered as limiting the technical spirit of the present invention. The scope of the invention is defined by the appended claims and all technical spirit within the range of equivalency of the claims should be construed as falling within the scope of the invention.

The invention claimed is:

1. A carbon dioxide capture apparatus having a temperature swing adsorption mode for selective separation of carbon dioxide from flue gases which contain carbon dioxides, comprising:
   a carbon dioxide sorption column including a carbon dioxide adsorption unit in which adsorption of carbon dioxide from flue gases occurs;
   a carbon dioxide desorption column connected to the carbon dioxide sorption column and including a carbon dioxide desorption unit in which desorption of the adsorbed carbon dioxide occurs;
   a carbon dioxide absorbent repeatedly adsorbing and desorbing carbon dioxide while circulating through the carbon dioxide sorption column and the carbon dioxide desorption column; and
   a heat exchange unit in which heat exchange occurs between the absorbent after carbon dioxide adsorption and the absorbent after carbon dioxide desorption,
   wherein the heat exchange unit has a structure:
   in which tubes through which the absorbent after carbon dioxide desorption is moved are inserted into a tube through which the absorbent after carbon dioxide adsorption is moved or tubes through which the absorbent after carbon dioxide adsorption is moved are inserted into a tube through which the absorbent after carbon dioxide desorption is moved; or
   in which planar passages through which the absorbent after carbon dioxide adsorption is moved are in face-to-face contact with planar passages through which the absorbent after carbon dioxide desorption is moved.

2. The carbon dioxide capture apparatus according to claim 1, wherein the absorbent after carbon dioxide adsorption and the absorbent after carbon dioxide desorption are moved under bubbling fluidized bed conditions and dilute fluidized bed conditions in the heat exchange unit, respectively, and the heat exchange unit is placed upstream of the sorption column.

3. The carbon dioxide capture apparatus according to claim 1, wherein the absorbent after carbon dioxide adsorption and the absorbent after carbon dioxide desorption are moved under dilute fluidized bed conditions and bubbling fluidized bed conditions in the heat exchange unit, respectively, and the heat exchange unit is placed downstream of the sorption column.

4. The carbon dioxide capture apparatus according to claim 1, wherein the absorbent after carbon dioxide adsorption and the absorbent after carbon dioxide desorption are moved under dilute fluidized bed conditions and bubbling fluidized bed conditions in the heat exchange unit, respectively, and the heat exchange unit is placed upstream of the desorption column.

5. The carbon dioxide capture apparatus according to claim 1, wherein the absorbent after carbon dioxide adsorption and the absorbent after carbon dioxide desorption are moved under bubbling fluidized bed conditions and dilute fluidized bed conditions in the heat exchange unit, respectively, and the heat exchange unit is placed downstream of the desorption column.

6. The carbon dioxide capture apparatus according to claim 1, wherein the carbon dioxide adsorption unit is provided with cooling means.

7. The carbon dioxide capture apparatus according to claim 1, wherein the carbon dioxide desorption unit is provided with heating means.

8. The carbon dioxide capture apparatus according to claim 1, wherein the absorbent after carbon dioxide adsorption and the absorbent after carbon dioxide desorption are moved in different directions each other in the heat exchange unit.

9. The carbon dioxide capture apparatus according to claim 1, wherein a carbon dioxide adsorption/desorption unit comprising the carbon dioxide sorption column, the carbon dioxide desorption column, the carbon dioxide absorbent, and the heat exchange unit is provided in plurality and heat exchange occurs between the carbon dioxide adsorption/desorption units.

10. The carbon dioxide capture apparatus according to claim 9, wherein the carbon dioxide adsorption/desorption units are filled with carbon dioxide absorbents having different adsorption and/or desorption temperatures.

\* \* \* \* \*